(12) United States Patent
Manjunath (10) Patent No.: US 12,079,318 B2
(45) Date of Patent: Sep. 3, 2024

(54) METHOD AND SYSTEM FOR PASSENGER AUTHENTICATION

(71) Applicant: Rockwell Collins, Inc., Cedar Rapids, IA (US)

(72) Inventor: Naveen Manjunath, Bangalore (IN)

(73) Assignee: Rockwell Collins, Inc., Cedar Rapids, IA (US)

( * ) Notice: Subject to any disclaimer, the term of this patent is extended or adjusted under 35 U.S.C. 154(b) by 281 days.

(21) Appl. No.: 17/195,397

(22) Filed: Mar. 8, 2021

(65) Prior Publication Data

US 2022/0237272 A1    Jul. 28, 2022

(30) Foreign Application Priority Data

Jan. 28, 2021    (IN) .............................. 202141003885

(51) Int. Cl.
| H04L 29/06 | (2006.01) |
| G06F 21/32 | (2013.01) |
| G06N 3/08  | (2023.01) |
| H04L 9/06  | (2006.01) |

(52) U.S. Cl.
CPC .............. *G06F 21/32* (2013.01); *G06N 3/08* (2013.01); *H04L 9/0631* (2013.01)

(58) Field of Classification Search
None
See application file for complete search history.

(56) References Cited

U.S. PATENT DOCUMENTS

| 8,296,573 | B2 | 10/2012 | Bolle et al. |
| 9,667,627 | B2 * | 5/2017 | Gormley ............... H04L 9/0866 |
| 10,693,872 | B1 * | 6/2020 | Larson .................. H04L 9/3231 |
| 10,803,160 | B2 | 10/2020 | Tussy |

(Continued)

FOREIGN PATENT DOCUMENTS

| CN | 107801002 A | 3/2018 |
| EP | 3261059 A1 | 12/2017 |
| EP | 3723009 A1 | 10/2020 |

OTHER PUBLICATIONS

Alwahaishi, Saleh; Zdralek, Jaroslav. Biometric Authentication Security: An Overview. 2020 IEEE International Conference on Cloud Computing in Emerging Markets (CCEM). https://ieeexplore.ieee.org/stamp/stamp.jsp?tp=&arnumber=9499970 (Year: 2020).*

(Continued)

*Primary Examiner* — Jeremiah L Avery
(74) *Attorney, Agent, or Firm* — Suiter Swantz IP (57) ABSTRACT

A kiosk at a departure location may collect information from a passenger. The information collected may include a passport, a boarding pass, a departure photo, and a departure voice recording. The information may be stored in an encrypted database. A kiosk at an arrival location may also collect information from the passenger. The information collected may include a passport, a boarding pass, an arrival photo, and an arrival voice recording. The kiosk may retrieve the departure photo and the departure voice recording from the encrypted database based on the passport and the boarding pass. The kiosk may then compare the arrival photo and departure photos, and similarly the arrival voice recording and departure voice recording, to authenticate an identity of the passenger.

9 Claims, 6 Drawing Sheets

(56) References Cited

U.S. PATENT DOCUMENTS

| | | | |
|---|---|---|---|
| 2006/0206724 A1 | 9/2006 | Schaufele et al. | |
| 2010/0308108 A1 | 12/2010 | Choi et al. | |
| 2014/0162598 A1* | 6/2014 | Villa-Real | G07F 7/0886 |
| | | | 455/411 |
| 2014/0270383 A1* | 9/2014 | Pederson | G08G 1/207 |
| | | | 382/104 |
| 2017/0032485 A1* | 2/2017 | Vemury | G06F 16/22 |
| 2017/0149773 A1* | 5/2017 | Kovacs | H04L 67/306 |
| 2019/0130089 A1* | 5/2019 | Trelin | B60R 16/037 |
| 2020/0145219 A1* | 5/2020 | Sebastian | H04L 9/50 |
| 2020/0334347 A1 | 10/2020 | Hoyos et al. | |
| 2020/0381130 A1 | 12/2020 | Edwards et al. | |

OTHER PUBLICATIONS

Bilski, Piotr et al. Application of the RFID technology in the European Union border control system. 2017 IEEE International Conference on RFID Technology & Application (RFID-TA). https://ieeexplore.ieee.org/stamp/stamp.jsp?tp=&arnumber=8098908 (Year: 2017).*

Rodhe, Ioana et al. Future Schemes for Stronger Verification of the Access Rights of Border Control Inspection Systems. 2015 European Intelligence and Security Informatics Conference. https://ieeexplore.ieee.org/stamp/stamp.jsp?tp=&arnumber=7379717 (Year: 2015).*

Duta, Christina-Loredana et al., "Real-Time DSP Implementations of Voice Encryption Algorithms", Proceedings of the 3rd International Conference on Information Systems Security and Privacy (ICISSP 2017), pp. 439-446.

Farmani, Ali et al., "A high performance hardware implementation image encryption with AES algorithm", Proc. SPIE 8009, Third International Conference on Digital Image Processing (ICDIP 2011), 800905 (Jul. 8, 2011), 8 pages.

LeCun, Yann et al., "Deep learning", Nature, vol. 521, May 28, 2015, 10 pages.

Wan, Li et al., "Generalized End-To-End Loss for Speaker Verification", arXiv:1710.10467v5 [eess.AS], Nov. 9, 2020, 5 pages.

Extended Search Report in European Application No. 22153417.5 dated Jun. 15, 2022, 5 pages.

* cited by examiner

METHOD AND SYSTEM FOR PASSENGER AUTHENTICATION

CROSS-REFERENCE TO RELATED APPLICATION

The present application claims the benefit of India Provisional Patent Application 202141003885, filed Jan. 28, 2021, entitled Method and System for Passenger Authentication, naming Naveen Manjanuth as inventor, which is incorporated herein by reference in the entirety.

BACKGROUND

Boarding passes may first be scanned at a departure location, such as an airport. A passenger may then board a transportation vehicle, such as an airplane, and travel to a destination location. Upon arriving at the destination location, the boarding pass may again be scanned. The boarding pass scans may be compared to verify an identity of the passenger. Such arrival verification may be required, due to heightened travel regulations.

Enhanced integrity of authentication may occur by finger print scanners at the departure and arrival locations. However, by the finger print scanners, a common touch-point may be shared by a plurality of passengers. This common touch point may be undesirable given viral and bacterial concerns. Therefore, it would be advantageous to provide a device, system, and method that cures the shortcomings described above.

SUMMARY

A method is disclosed, in accordance with one or more embodiments of the present disclosure. In one illustrative embodiment, the method includes collecting, by a kiosk at a departure location, departure information including a passport, a boarding pass, a departure photo of a passenger's face, and a departure voice recording of a passenger's voice. In another illustrative embodiments, the method includes transmitting the departure information to a server. In another illustrative embodiments, the method includes collecting, by a kiosk at an arrival location, arrival information including the passport, the boarding pass, an arrival photo of the passenger's face, and an arrival voice recording of the passenger's voice. In another illustrative embodiments, the method includes transmitting, by the kiosk at the arrival location, at least some of the arrival information to the server, the at least some of the arrival information including the passport and the boarding pass. In another illustrative embodiments, the method includes determining, by the server, a correspondence between the arrival information and the departure information, the correspondence determined based on a match between the boarding pass of the departure information and the boarding pass of the arrival information, the correspondence further determined based on a match between the passport of the departure information and the passport of the arrival information. In another illustrative embodiments, the method includes receiving, by the kiosk at the arrival location, the departure voice recording and the departure photo from the server. In another illustrative embodiments, the method includes comparing, by the kiosk at the arrival location, the departure voice recording with the arrival voice recording and the departure photo with the arrival photo to authenticate an identity of the passenger.

A system is disclosed, in accordance with one or more embodiments of the present disclosure. In one illustrative embodiment, the system includes a passport scanner configured to read a passport of a passenger. In another illustrative embodiment, the system includes a boarding pass scanner configured to read a boarding pass of a passenger. In another illustrative embodiment, the system includes a camera configured to take a photo of a passenger's face. In another illustrative embodiment, the system includes a voice recorder configured to take a voice recording of the passenger. In another illustrative embodiment, the system includes a processor and a memory, wherein the processor is communicatively coupled to the memory, the passport scanner, the boarding pass scanner, the camera, and the voice recorder. In another illustrative embodiment, the processor is configured to execute a set of program instructions maintained on the memory. In another illustrative embodiment, the set of program instructions are configured to cause the processor to encrypt information, the encrypted information including at least the passport and the boarding pass of the passenger. In another illustrative embodiment, the set of program instructions are and configured to cause the processor to transmit the encrypted information to a server. In another illustrative embodiment, the set of program instructions are configured to cause the processor to receive, from the server, an additional voice recording of the passenger and an additional photo of the passenger's face. In another illustrative embodiment, the set of program instructions are configured to cause the processor to authenticate an identity of the passenger by an authentication module stored in the memory. In another illustrative embodiment, the authentication module stored in the memory is configured to compare the photo with the additional photo by a facial identification module. In another illustrative embodiment, the authentication module stored in the memory is configured to compare the voice recording with the additional voice recording by a voice recognition module.

BRIEF DESCRIPTION OF THE DRAWINGS

Implementations of the concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION OF THE INVENTION

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination or sub-combination of two or more such features, along with any other features which may not necessarily be expressly described or inherently present in the instant disclosure.

Reference will now be made in detail to the subject matter disclosed, which is illustrated in the accompanying drawings.

A departure location may include a location where a passenger boards a transport vehicle (e.g., an airplane). Similarly, an arrival location may include a location where a passenger gets off the transport vehicle. A kiosk may be disposed at the departure location and the arrival location. The kiosk may be used to scan a passport, scan a boarding pass, take a voice recording, and take a photo of the passenger. The voice recording from the arrival location (e.g., an arrival voice recording) may be compared against the voice recording from the departure location (e.g., a departure voice recording). Such comparison may be performed by a voice recognition software. Similarly, the photo from the arrival location (e.g., an arrival photo) may be compared against the photo recording from the departure location (e.g., a departure photo). Such comparison may be performed by an image or facial recognition software. Based on the voice and photo comparisons, an identify of the passenger may be authenticated. In this regard, to be authenticated, the passenger must: have the same passport at arrival and departure, have the same boarding pass at arrival and departure, have a similar voice at arrival and departure, and have a facial appearance at arrival and departure.

In a departure location, a departure photo of the passenger may be taken. Similarly, the passenger may speak keywords. The spoken keywords together with the departure photo may be recorded. The departure photo and recorded keywords may then be stored in an encrypted database. The encrypted database may be accessible from both the departure location and an arrival location. In embodiments, the encrypted database may be accessible from any number of airports.

Upon arriving at the arrival location, an arrival photo may be taken of the passenger. Similarly, the passenger will speak the keyword an additional time. The arrival photo and spoken keywords may optionally be recorded in the database. The departure photo and the departure keywords may be accessed by the kiosk. The arrival photo and the departure photo may then be compared. For example, the arrival photo and the departure photo may be compared by the kiosk, by image and/or facial recognition software. Similarly, the departure voice recording and the arrival voice recording may be compared. For example, the spoken keywords may be compared using voice recognition software. Upon receiving confirmation of a match between the spoken keywords and a match between the photos, the identity of the passenger may be authenticated. Thus, the passenger's identity may be verified without requiring a fingerprint scan.

A passport (not depicted) may include a machine-readable area. The machine-readable area may include various encoded information, such as, but not limited to a name, a passport number, a nationality, a date of birth, or an expiration date. Optionally, the passport may include one or more embedded microchips (e.g., including various biometric data). Similarly, a boarding pass (not depicted) may include a barcode, such as a two-dimensional (2D) barcode. Such 2D barcode may include encoded information, such as, but not limited to, a format code, a passenger name, a departure airport, a destination airport, a flight number, a carrier, one or more date information, a frequent flyer number, and/or a sequence number (e.g., an order checked-in at a gate). Furthermore, the barcode may be encoded by any suitable standard, such as, but not limited to, a PDF417 format (e.g., ISO standard 15438).

Figure 1:
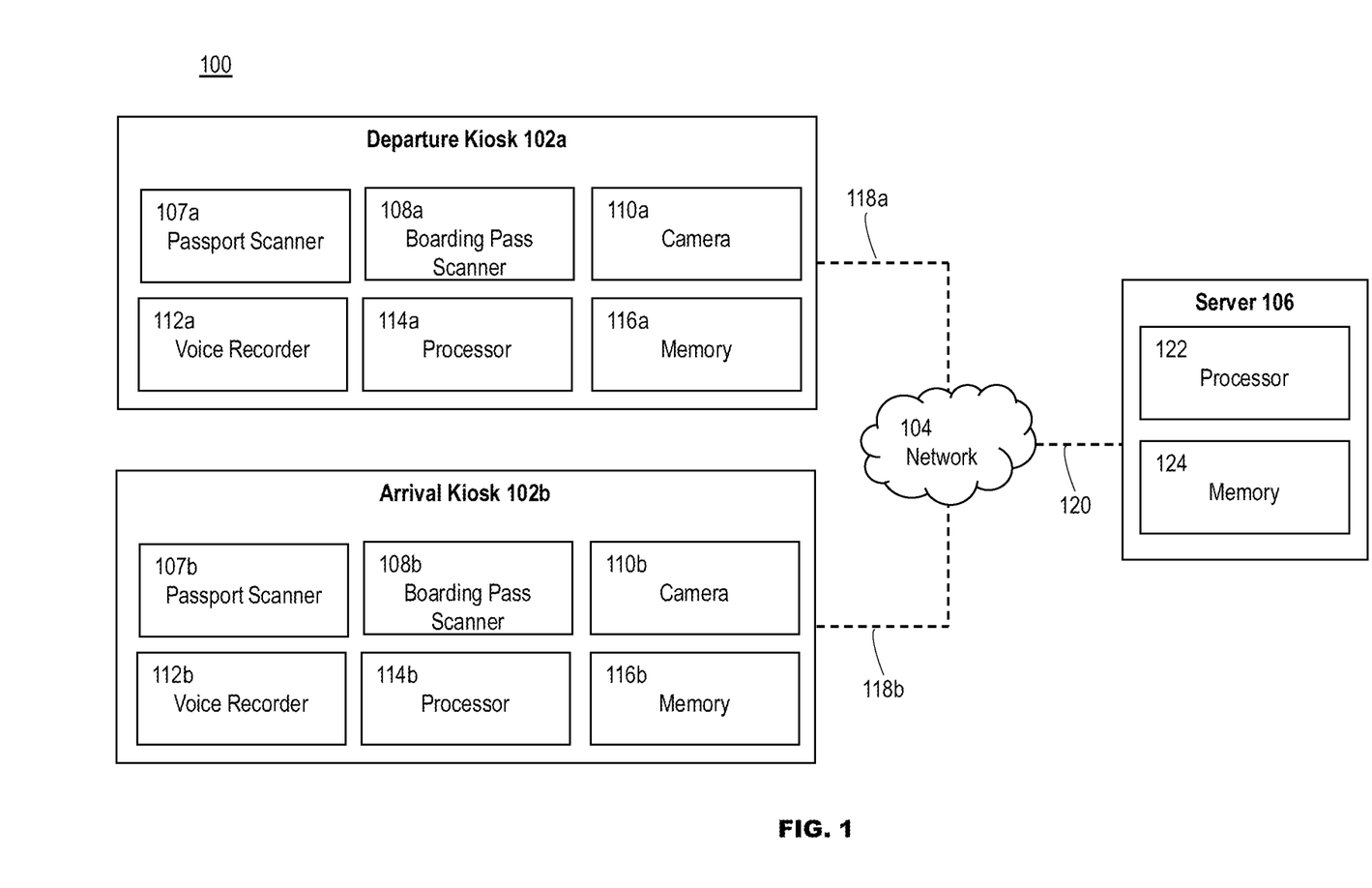
FIG. 1 depicts a schematic diagram of a system, in accordance with one or more embodiments of the present disclosure.

FIG. 1 depicts a simplified block diagram of a system for performing a touch-less immigration method, in accordance with one or more embodiments of the present disclosure.

In embodiments, a system 100 includes a departure kiosk 102a, an arrival kiosk 102b, a network 104, and a server 106.

The departure kiosk 102a may be located at a departure location and an arrival kiosk 102b may be located at an arrival location. The server 106 may be communicatively coupled to the departure kiosk 102a and the arrival kiosk 102b via the network 104. In this regard, the server 106 and/or the kiosks 102a, 102b may include a communication interface (e.g., communication interface 118a, 118b, 120) suitable for communication by the network 104, as described further herein. By the communicative coupling, the server 106 may be configured to receive data from and transmit data to various components of the system 100, such as, the departure kiosk 102a, the arrival kiosk 102b, or any sub-component thereof. Such data may include, but is not limited to, boarding pass information, voice recording, and/or photos.

A kiosk 102 (e.g., departure kiosk 102a, or arrival kiosk 102b) may include a passport scanner 107 (e.g., passport scanner 107a, 107b), boarding pass scanner 108 (e.g., boarding pass scanner 108a, 108b), a camera 110 (e.g., camera 110a, 110b), a voice recorder 112 (e.g., voice recorder 112a, 112b), a processor 114 (e.g., processor 114a, 114b), a memory 116 (e.g., memory 116a, 116b), and a communication interface 118 (e.g., communication interface 118a, 118b). The discussion of the components of the kiosk 102 should be interpreted to extend to the departure kiosk 102a and similarly to the arrival kiosk 102b, where appropriate. For example, the kiosk 102 may function as both the departure kiosk 102a and the arrival kiosk 102b.

By the passport scanner 107, the passport of the passenger may be scanned to determine passport information (e.g., a name, a passport number, a nationality, date of birth, expiration date). The passport scanner 107 may then communicate the passport information to one or more components of the kiosk 102, such as the processor 114. As may be understood, the passport scanner 107 may include any suitable passport scanner configured to scan the passport. For example, the passport scanner may be configured to read the passport in a machine-readable travel format.

By the boarding pass scanner 108, the passengers boarding pass may be scanned to determine boarding pass information (e.g., a format code, a passenger name, a departure airport, a destination airport, a flight number, a carrier, one or more date information, a frequent flyer number, and/or a sequence number). The boarding pass scanner 108 may then communicate the boarding pass information to one or more components of the kiosk 102, such as the processor 114. As may be understood, the boarding pass scanner 108 may include any suitable scanner configured to scan the boarding pass. For example, the boarding pass scanner may include a 2D barcode scanner configured to scan a PDF417 barcode.

By the camera 110, a photo of the passenger may be taken. The camera 110 may then communicate the photo to one or more components of the kiosk 102, such as the processor 114. As may be understood, the camera 110 may include any suitable camera configured to take a photo of the passenger. For example, the camera 110 may include an image transducer. As may be understood, the photo may include any suitable file format, such as, but not limited to, JPEG, TIFF, GIF, GMP, PNG, a pixmap file, or SVG.

By the voice recorder 112, a voice recording of the passenger may be taken. The voice recorder 112 may then communicate the voice recording to one or more components of the kiosk 102, such as the processor 114. As may be understood, the voice recorder 112 may include any suitable recorder configured to take a voice recording of the passenger. For example, the voice recorder 112 may include a microphone transducer. As may be understood, the voice recording may be maintained in any suitable file format, such as, but not limited to mp3, mp4, WAV, FLAC. In embodiments, the kiosk 102 prompts the passenger to say a word or phrase. For example, the kiosk 102 may prompt the passenger to repeat the passenger's name.

Although the camera 110 and the voice recorder 112 are described as separate components of the kiosk 102, this is not intended as a limitation on the present disclosure. In this regard, the camera 110 and the voice recorder 112 may be implemented as an audio/video recorder which is configured to take the photo and the voice recording. For example, the audio/video recorder may include an audio/video transducer. The audio/video recorder may be configured to record the voice recording together with the photo (e.g., a plurality of photos based on a framerate of the video) in any suitable format, such as, but not limited to, MP4, MOV, AVI, or WMV.

In embodiments, the processor 114 of the kiosk 102 may receive the passport information, boarding pass information, the photo, and the voice recording. The processor 114 may further be configured to execute a set of program instructions stored in memory 116, the set of program instructions configured to cause the processor 114 to carry out various steps of the present disclosure. For example, the processor 114 may be configured to transmit one or more of the passport information, boarding pass information, the photo, and the voice recording to the network 104 (and subsequently to the server 106) by the communication interface 118, and similarly receive such information from the network 104. The processor 114 may further be configured to encrypt and/or decrypt such information by any encryption standard, such as, but not limited to, an Advanced Encryption Standard (AES). The AES may include a block size of 128 bits together with a key size of 128 bits, 192 bits, or 256 bits.

AES Encryption is described in "Real-time DSP Implementations of Voice Encryption Algorithms", by Cristina-Loredana Duta et al, which is incorporated herein by reference in its entirety.

AES Encryption is also described in "A high performance hardware implementation image encryption with AES algorithm", by Ali Farmani et al, which is incorporated herein by reference in its entirety.

In embodiments, the server 106 includes a communication interface 120, a processor 122, and a memory 124. By the communication interface 120, the server 106 may be configured to receive and/or transmit information by way of the network 104. For example, the server 106 may receive and/or transmit information including a passport, boarding pass, photos, and sound recordings. The processor 122 may be coupled with the communication interface 120. The processor 122 may further be configured to execute a set of program instructions stored in memory 124, the set of program instructions configured to cause the processor 122 to carry out various steps of the present disclosure. For example, the processor 122 may be configured to receive the information including the passport, the boarding pass, the photo, and the voice recording from the departure kiosk 102a. The processors 122 may further be configured to store and retrieve the information including the passport, the boarding pass, the photo, and the voice recording in the memory 124.

The processor 122 may also be configured to receive arrival information including a passport and boarding pass from the arrival kiosk 102b. The processor 122 may use the arrival information including the passport and the boarding pass from the arrival kiosk 102b to find a matching departure information including a passport and boarding pass from the departure kiosk 102a stored in the memory 124. The processor 122 may similarly access the departure photo and departure voice recording of the departure information. The processor 122 may then transmit the departure photo and the departure voice recording to the arrival kiosk 102b (e.g., by way of the various communication interfaces and the network 104).

Figure 2A:
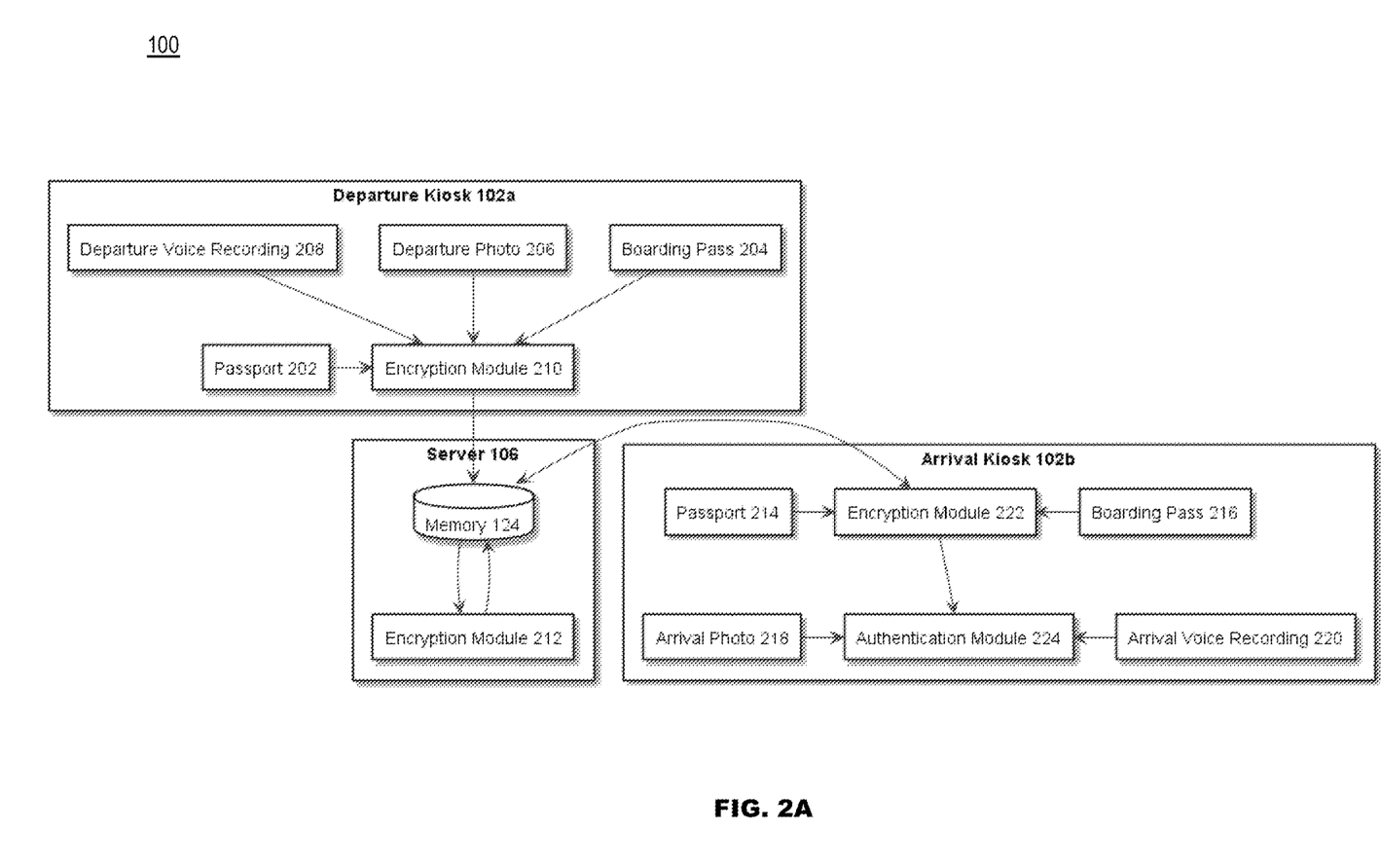
FIG. 2A depicts a flow diagram of a system, in accordance with one or more embodiments of the present disclosure.
Figure 2B:
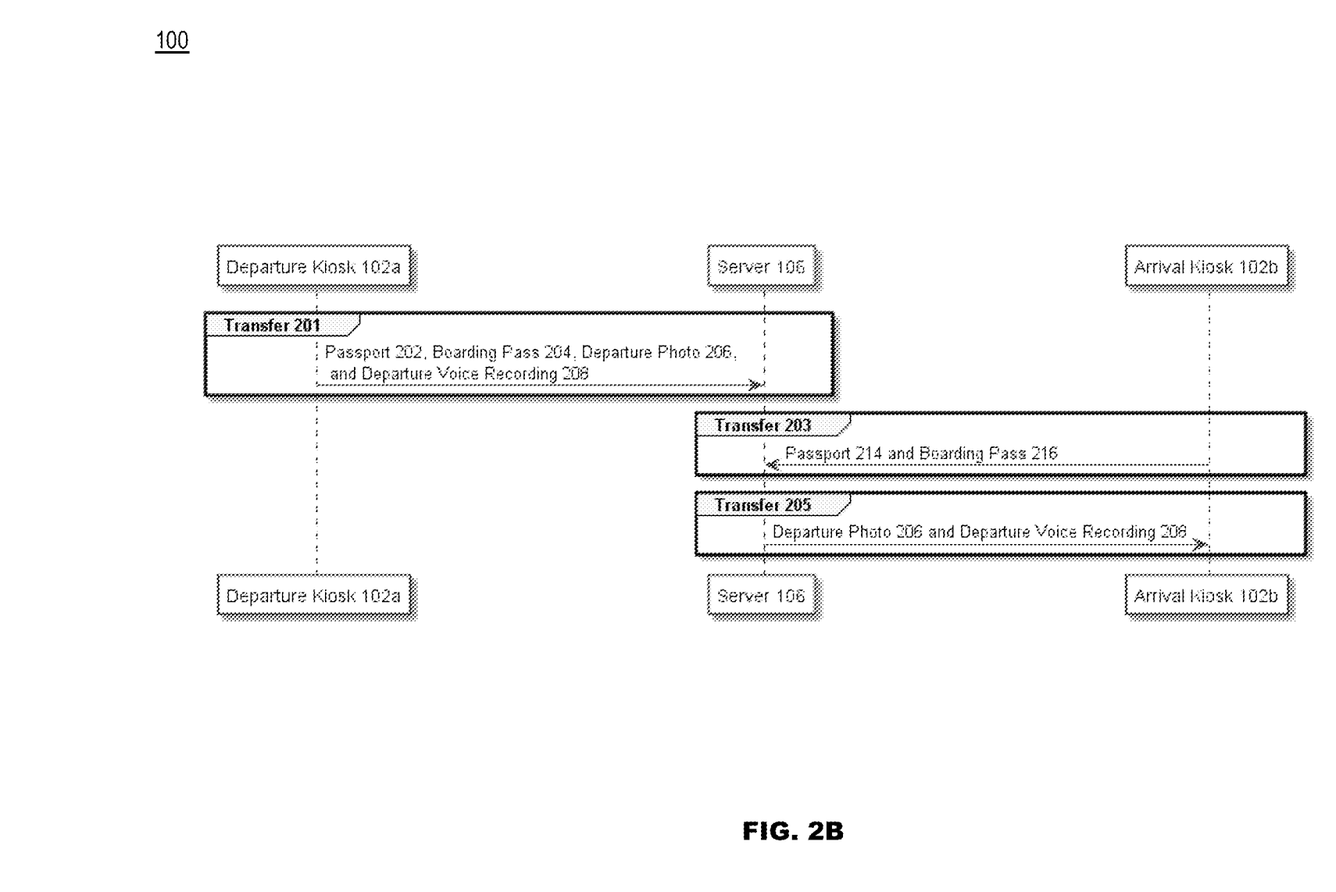
FIG. 2B depicts a sequence diagram of a system, in accordance with one or more embodiments of the present disclosure.

FIGS. 2A-2B depict the system 100, in accordance with one or more embodiments of the present disclosure.

The departure kiosk 102a may determine various departure information, including a passport 202, boarding pass 204, departure photo 206, and a departure voice recording 208. Such passport 202, boarding pass 204, departure photo 206, and departure voice recording 208 may be taken by one or more components of the departure kiosk 102a, such as, the passport scanner 107a, the boarding pass scanner 108a, the camera 110a, and the voice recorder 112a.

The passport 202, boarding pass 204, departure photo 206, and departure voice recording 208 may be provided to an encryption module 210 of the departure kiosk 102a. The encryption module 210 may include a set of program instructions maintained on the memory 116a, the program instructions configured to cause the processor 114a to encrypt the passport 202, boarding pass 204, departure photo 206, and departure voice recording 208. For example, the passport 202, boarding pass 204, departure photo 206, and departure voice recording 208 may be encrypted by the Advanced Encryption Standard (AES).

The departure kiosk 102a may then transmit the encrypted information including the passport 202, boarding pass 204, departure photo 206, and departure voice recording 208. For example, the departure kiosk 102a may transmit the encrypted information by way of the communication interface 118a and the network 104. The server 106 may then receive the encrypted information including the passport 202, boarding pass 204, departure photo 206, and departure voice recording 208 (see transfer 201, FIG. 2B). For example, the server 106 may receive the encrypted information by way of the network 104 and the communication interface 120. The encrypted information may then be stored in the memory 124, for future access (e.g., for authenticating a passenger's arrival).

In embodiments, the server 106 includes an encryption module 212. The encryption module 212 may include a set of program instructions maintained on the memory 124, the program instructions configured to cause the processor 122 to decrypt encrypted information, such as the departure information received from the departure kiosk 102a, including the passport 202, boarding pass 204, departure photo 206, and departure voice recording 208. In this regard, the server 106 may decrypt the encrypted departure information as needed (e.g., for retrieving the departure photo 206 and the departure voice recording 208). The program instructions may also be configured to cause the processor to decrypt encrypted information, such as the arrival information received from the arrival kiosk 102b, including passport 214 and/or boarding pass 216 (see transfer 203, FIG. 2B).

Similar to the departure kiosk 102a, the arrival kiosk 102b may determine arrival information including, a passport 214, boarding pass 216, arrival photo 218, and arrival voice recording 220. Such passport 214, boarding pass 216, arrival photo 218, and arrival voice recording 220 may be taken by one or more components of the arrival kiosk 102a, such as, the passport scanner 107b, the boarding pass scanner 108b, the camera 110b, and the voice recorder 112b.

In embodiments, the passport 214 and the boarding pass 216 may be provided to an encryption module 222 of the arrival kiosk 102b. The encryption module 222 may include a set of program instructions maintained on the memory 116b, the program instructions configured to cause the processor 114b to encrypt the passport 214 and the boarding pass 216. For example, the passport 214 and the boarding pass 216 may be encrypted by the Advanced Encryption Standard (AES). The arrival kiosk 102b may then transmit the encrypted information including the passport 214 and the boarding pass 216 (e.g., to the server 106, as previously described). For example, the arrival kiosk 102b may transmit the encrypted information by way of the communication interface 118b and the network 104.

The server 106 may receive the passport 214 and the boarding pass 216 from the arrival kiosk 102b. The server may then index and retrieve the departure photo 206 and departure voice recording 208 (e.g., by a database hashing method). The server 106 may then transmit encrypted information including the departure photo 206 and the departure voice recording 208 by way of the communication interface 120 and the network 104 (see transfer 205, FIG. 2B).

The arrival kiosk 102b may further receive encrypted information including departure photo 206 and departure voice recording 208 from the server 106, in response to transmitting the at least some of the arrival information, including the passport 214 and the boarding pass 216. The encrypted information may optionally be stored in the memory 116b. The encrypted information including the departure photo 206 and departure voice recording 208 may then be provided to the encryption module 222 of the arrival kiosk 102b for decryption.

In embodiments, the arrival kiosk 102b is configured to authenticate the passenger's identity. The arrival kiosk 102b may authenticate the passenger's identity by a match between the departure photo 206 and the arrival photo 218, and similarly by a match between the departure voice recording 208 and the arrival voice recording 220. For example, the departure photo 206, departure voice recording 208, arrival photo 218, and arrival voice recording 220 may be provided to an authentication module 224 of the arrival kiosk 102b. By the authentication module 224, the arrival kiosk 102b may authenticate the passenger's identity. The authentication module 224 may include a set of program instructions maintained on the memory 116b, the program instructions configured to the processor 114b to authenticate the match between the departure photo 206 and the arrival photo 218, and similarly authenticate the match between the departure voice recording 208 and the arrival voice recording 220. Such authentication module 224, is described further herein.

Figure 3:
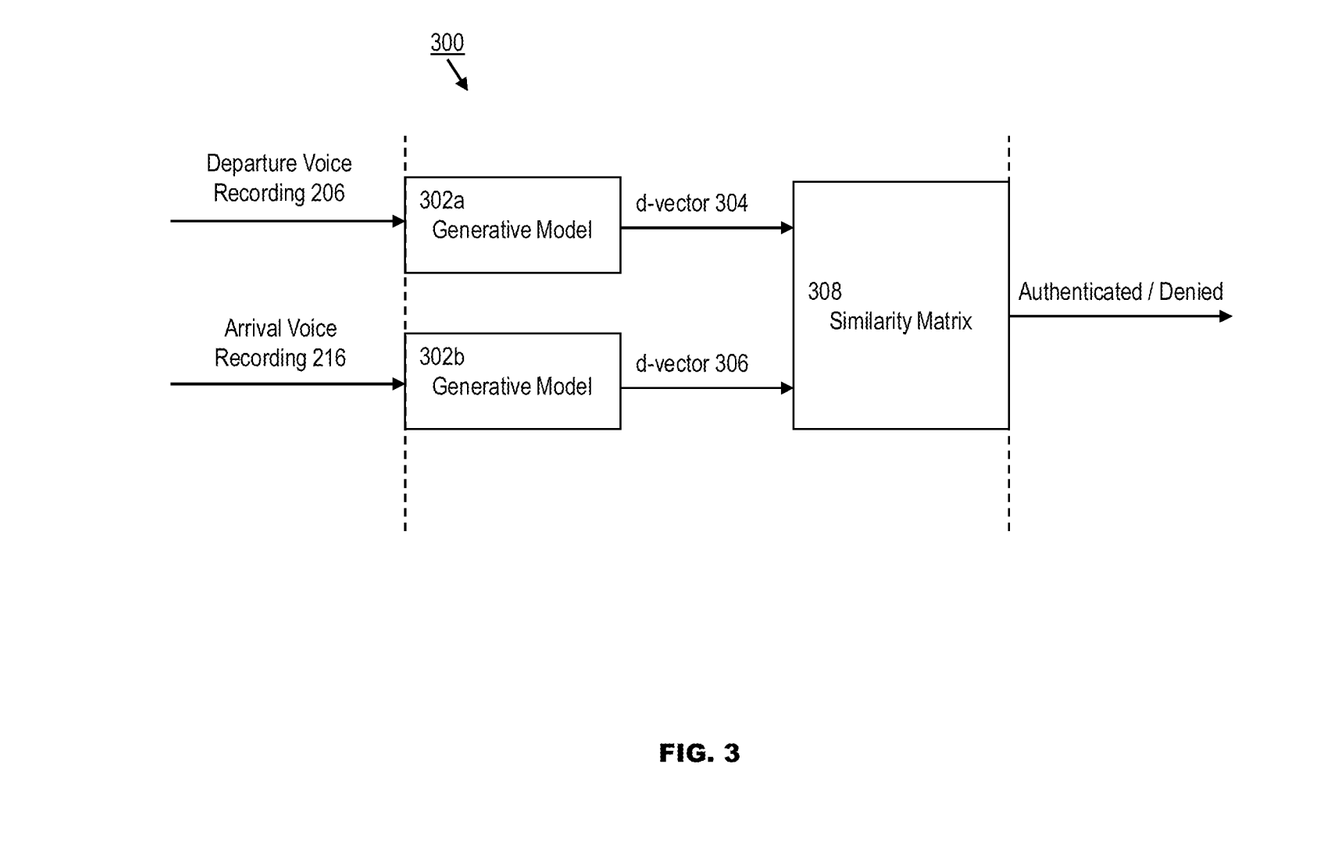
FIG. 3 depicts voice recognition by a module, in accordance with one or more embodiments of the present disclosure.
Figure 4:
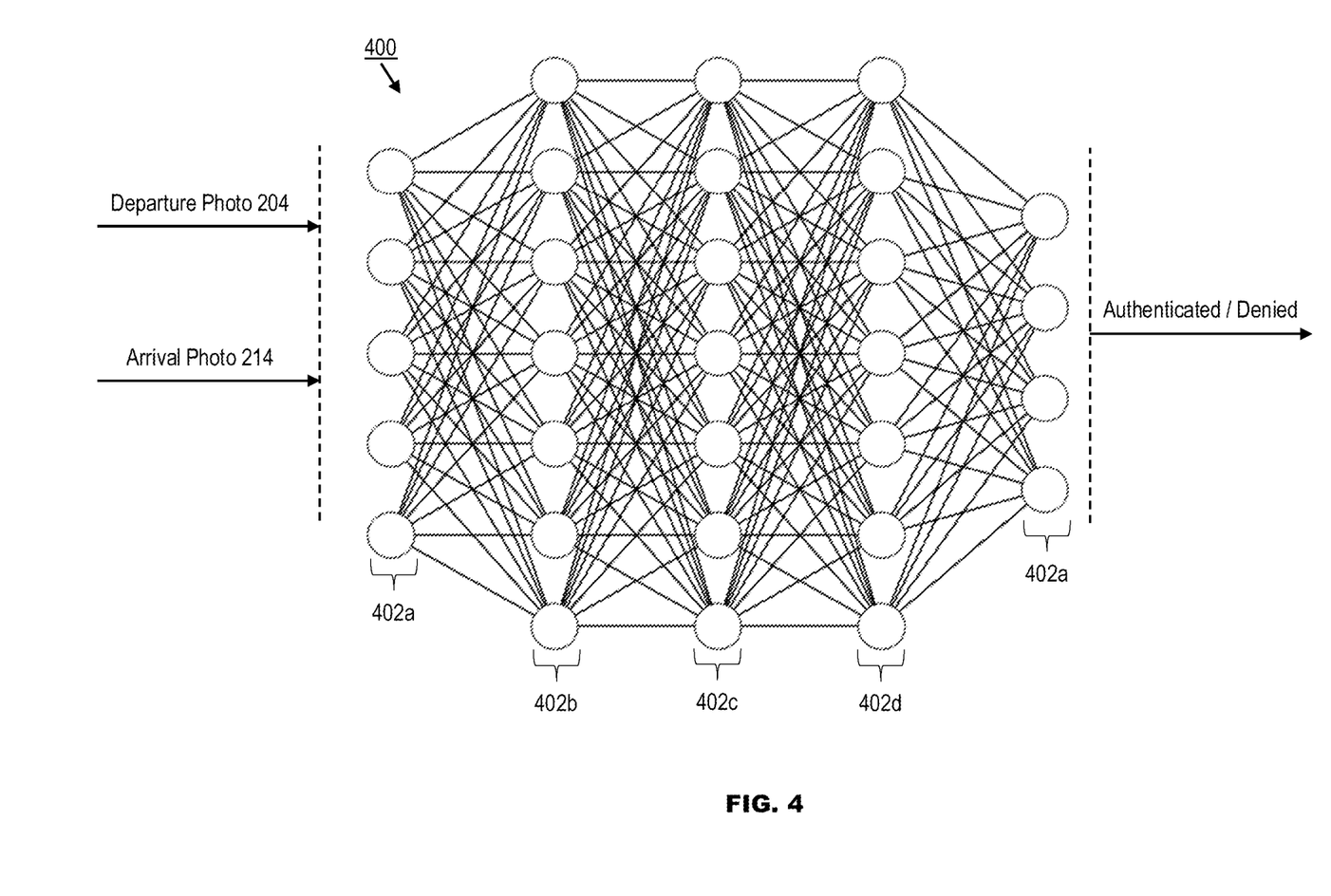
FIG. 4 depicts image recognition by a module, in accordance with one or more embodiments of the present disclosure.

Referring generally to FIGS. 3-4, one or more authentication modules are described, in accordance with one or more embodiments of the present disclosure.

Deep Neural Networks (DNNs) are part of a family of machine learning. Deep learning methods may be based on artificial neural networks with representation learning. Learning can be supervised, semi-supervised or unsupervised. The DNN may include layers to extract higher-level features from a raw input. In deep learning, each layer learns to transform its input data into a slightly more abstract and composite representation. As may be understood, the models described herein may be pre-trained. In this regard, the modules may be trained with a sufficiently large dataset of voice and/or image data, where appropriate.

Referring now to FIG. 3, a voice recognition module is described, in accordance with one or more embodiments of the present disclosure.

In embodiments, the authentication module 224 includes a voice recognition module 300. The voice recognition module 300 may include a set of program instructions maintained on the memory 116b, the program instructions configured to cause the processor 114b to authenticate the match between the departure voice recording 208 and the arrival voice recording 220.

"Generalized End-To-End Loss For Speaker Verification", by Li Wan et al, is incorporated herein by reference in its entirety.

For example, the departure voice recording 208 and the arrival voice recording 220 may be provided to a generative DNN model 302 (e.g., Generative Model 302a, Generative Model 302b). The generative DNN model 302 may extract discriminative vectors (d-vectors) from the recordings. In embodiments, a departure d-vector 304 may be generated for the departure voice recording 208, and an arrival d-vector 306 may be generated from the arrival voice recording 220.

The d-vectors 304, 306, may then be provided to a similarity matrix 308. The similarity matrix 308 may determine if the departure voice recording 208 and arrival voice recording 220 were generated by the same person. For example, the similarity matrix 308 may include a cosine similarity taken between the departure d-vector 304 and the arrival d-vector 306. Based on the similarity matrix 308, the voice recognition module 300 may then output a value authenticating (or denying) the passenger's identity based on the departure voice recording 208 and arrival voice recording 220

Referring now to FIG. 4, an image recognition module is described, in accordance with one or more embodiments of the present disclosure.

In embodiments, the authentication module 224 include an image recognition module 400. The image recognition module 400 may include a set of program instructions maintained on the memory 116b, the program instructions configured to the processor 114b to authenticate the match between the departure photo 206 and the arrival photo 218.

"Deep Learning", by Yann LeCun et al, is incorporated herein by reference, in its entirety.

In embodiments, the image recognition module 400 may include a neural network. The neural network may include a layer 402 of neural connections. Such neural connections may be interconnected. For example, where the neural network is a deep neural network, a plurality of layers of the neural connections may exist. Where the DNN is used for image recognition tasks, an input may be a matrix of pixels (e.g., the arrival photo 204 and departure photo 214), a first layer 402a may identify pixel values, a second layer 402b may identify edges, a third layer 402c may identify combinations of edges, a fourth layer 402d may identify features, and a fifth layer 402e may identify combinations of features. The Deep Neural Network may then output a value authenticating (or denying) the passengers identity based on the departure photo 206 and arrival photo 218.

Where the image recognition module 400 includes a deep neural network, such neural network may include any suitable number of layers, nodes per layer, and weight values between nodes. In this regard, a deep learning model may learn which features should be placed on which level.

Figure 5:
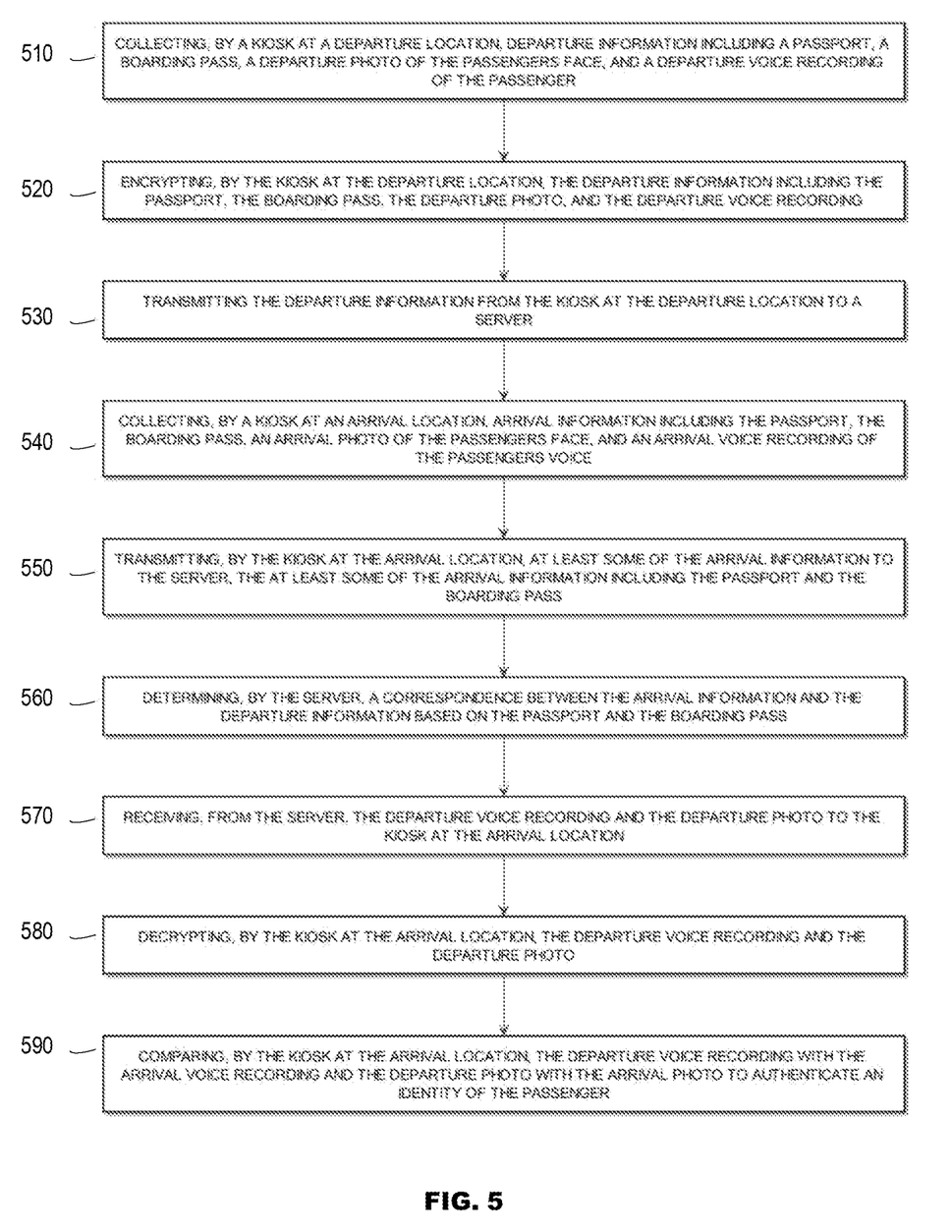
FIG. 5 depicts a flow-diagram of a method, in accordance with one or more embodiments of the present disclosure.

FIG. 5 depicts a method 500, in accordance with one or more embodiments of the present disclosure. It is noted herein that the steps of the method 500 may be implemented all or in part by system 100. It is further recognized that the method 500 is not limited to the system 100 in that additional or alternative system-level embodiments may carry out all or part of the steps.

In a step 510, a kiosk collects departure information including a passport (e.g., passport 202), a boarding pass (e.g., boarding pass 204), a departure photo (e.g., departure photo 206) of a passenger's face, and a departure voice recording (e.g., departure voice recording 208) of the passenger's voice. The departure information may be collected by a kiosk at a departure location (e.g., departure kiosk 102a).

In a step 520, the kiosk encrypts the departure information including the passport, the boarding pass, the departure photo of the passenger's face, and the departure voice recording to generate encrypted departure information. The departure information may be encrypted by a module (e.g., encryption module 210) of the kiosk. The kiosk may encrypt the departure information by an Advanced Encryption Standard (AES), in accordance with one or more embodiments of the present disclosure.

In a step 530, the kiosk transmits (e.g., transfer 201) the departure information to a server (e.g., server 106). Upon receiving the departure information, the server may store the departure information in a memory of the server.

In a step 540, an additional kiosk collects arrival information including a passport (e.g., passport 214), a boarding pass (e.g., boarding pass 216), an arrival photo (e.g., arrival photo 218) of the passenger's face, and an arrival voice recording (e.g., arrival voice recording 220) of the passenger's voice. The arrival information may be collected by a kiosk at an arrival location (e.g., arrival kiosk 102b). One or more components of the arrival information, such as the passport and the boarding pass, may be encrypted by a module (e.g., encryption module 222) of the additional kiosk. Such encryption of the passport and the boarding pass may be performed before transmission of the information for protecting the arrival information.

In a step 550, the additional kiosk transmits at least some of the arrival information, including the passport and boarding pass, to the server. Upon receiving the arrival information, the server may store the arrival information in a memory of the server.

In a step 560, the server determines a correspondence between the arrival information and the departure information, the correspondence determined based on a match between the boarding pass of the departure information and the boarding pass of the arrival information, the correspondence further determined based on a match between the passport of the departure information and the passport of the arrival information. The server may be configured to determine the correspondence between the departure information and the arrival information by any suitable method, such as, but not limited to, hashing. Upon determining the correspondence between the departure information and the arrival information, the server may retrieve the departure voice recording and the departure photo from a memory of the server, and transmit the departure voice recording and the departure photo to the additional kiosk at the arrival location.

In a step 570, the additional kiosk receives the departure voice recording and the departure photo from the server.

In a step 580, the additional kiosk decrypts the departure voice recording and the departure photo. The additional kiosk may be configured to decrypt the departure voice recording and the departure photo by an encryption module (e.g., encryption module 222).

In a step 590, the additional kiosk compares the departure voice recording with the arrival voice recording and the departure photo with the arrival photo to authenticate an identity of the passenger. The departure voice recording may be compared with the arrival voice recording by a voice recognition module (e.g., voice recognition module 300). The voice recognition module may extract a discriminative embedding vector (d-vector 304, 306) for the arrival voice recording and the departure voice recording. Furthermore, the voice recognition module may authenticate the arrival voice recording by applying a cosine similarity function to the discriminative embedding vector of the arrival voice recordings and the departure voice recordings. The departure photo and the arrival photo may be compared by an image recognition module (e.g., image recognition module 400). For example, the image recognition module may include a deep neural network.

Referring generally again to FIGS. 1A-5, the system 100 and method 500 is disclosed.

In embodiments, passport 202 scanned at the departure kiosk 102a and a passport 214 scanned at the arrival kiosk 102b may be the same. Similarly, the boarding pass 204 scanned at the departure kiosk 102a and the boarding pass 216 scanned at the arrival kiosk 102b may be the same. This may be a step in authenticating the passenger's identity. For example, the passport and the boarding pass are scanned at the departure location, the passport and the boarding pass are transported with the passenger from the departure location to the arrival location, and the passport and the boarding pass are scanned at the arrival location.

In embodiments, the departure voice recording 208 and the arrival voice recording 220 include the same word or phrase. By reciting the same word or phrase at departure and arrival, the authentication module 224 may have an improved ability to authenticate the passenger's identity. For example, the word or phrase may include, but is not limited to, the passenger's name.

Although much of the present disclosure is contemplated in regards to airport kiosks, this is not intended as a limitation on the present disclosure. In this regard, the kiosks may be disposed at any arrival and departure location.

Each of the subsystem(s) or system(s) described herein may take various forms, including a network server, personal computer system, image computer, mainframe computer system, workstation, network appliance, Internet appliance, or other device. In general, the term "system" may be broadly defined to encompass any device having one or more processors, which executes instructions from a memory medium. The subsystem(s) or system(s) may also include any suitable processor known in the art such as a parallel processor.

The processors 114 (e.g., processor 114a, processor 114b), 122 described herein may include any one or more processing elements known in the art. In this sense, a processor may include any microprocessor-type device configured to execute software algorithms and/or instructions. For example, the processors 114, 122 may consist of a desktop computer, mainframe computer system, workstation, image computer, parallel processor, or other computer system (e.g., networked computer) configured to execute a program configured to operate the system 100, as described throughout the present disclosure. It should be recognized that the steps described throughout the present disclosure may be carried out by a single computer system or, alternatively, multiple computer systems. Furthermore, it should be recognized that the steps described throughout the present disclosure may be carried out on any one or more of the one or more processors 114, 122. In general, the term "processor" may be broadly defined to encompass any device having one or more processing elements, which execute program instructions from a memory. Therefore, the above description should not be interpreted as a limitation on the present disclosure but merely an illustration.

The memory 116 (e.g., memory 116a, memory 116b), 124 may include any storage medium known in the art suitable for storing program instructions executable by the associated processors 114, 122. For example, the memory 116, 124 may include a non-transitory memory medium. For instance, the memory 116, 124 may include, but is not limited to, a read-only memory (ROM), a random-access-memory (RAM), a magnetic or optical memory device (e.g., disk), a solid-state-drive (SSD) and the like. It is further noted that memory 116, 124 may be housed in a common controller housing with the one or more processors 114, 122. In an alternative embodiment, the memory 116, 124 may be located remotely with respect to the physical location of the processors 114, 122, and the like. For instance, the processors 114, 122 and/or the server 106 may access a remote memory (e.g., server), accessible through a network (e.g., internet, intranet and the like).

The communication interface 118 (e.g., communication interface 118a, communication interface 118b), communication interface 120 may include any network interface device known in the art. For instance, the network interface devices may include wireline-based interface devices (e.g., DSL-based interconnection, Cable-based interconnection, T9-based interconnection, and the like). In another instance, the network interface devices may include a wireless-based interface device employing GSM, GPRS, CDMA, EV-DO, EDGE, WiMAX, 3G, 4G, 4G LTE, 5G, Wi-fi protocols, and the like. The communication interface 118, 120 may be configured to communicate with the network 104 by any suitable transmission medium, such as a wireline or wireless medium. In this regard, the transmission medium may serve as a data link for the network 104.

What is claimed:

1. A method comprising:
    collecting, by a departure kiosk at a departure location, departure information including a departure passport, a departure boarding pass, a departure photo of a passenger's face, and a departure voice recording of a passenger's voice;
    transmitting, by the departure kiosk at the departure location, the departure information to a server;
    collecting, by an arrival kiosk at an arrival location, arrival information including an arrival passport, an arrival boarding pass, an arrival photo of the passenger's face, and an arrival voice recording of the passenger's voice;
    transmitting, by the arrival kiosk at the arrival location, the arrival passport and the arrival boarding pass to the server;
    determining, by the server, a a match between the departure boarding pass and the arrival boarding pass and a match between the departure passport and the arrival passport;
    transmitting the departure voice recording and the departure photo from the server to the arrival kiosk in response to determining the match between the departure boarding pass and the arrival boarding pass and the match between the departure passport and the arrival passport;
    receiving, by the arrival kiosk at the arrival location, the departure voice recording and the departure photo from the server; and
    comparing, by the arrival kiosk at the arrival location, the departure voice recording with the arrival voice recording and the departure photo with the arrival photo to authenticate an identity of the passenger.

2. The method of claim 1, further comprising storing the departure information in a memory of the server.

3. The method of claim 1, wherein the departure photo is compared with the arrival photo by a facial recognition module.

4. The method of claim 3, wherein the facial recognition module comprises a deep neural network.

5. The method of claim 1, wherein the departure voice recording is compared with the arrival voice recording by a voice recognition module.

6. The method of claim 5, wherein the voice recognition module is configured to:
   extract a discriminative embedding vector for the arrival voice recording and the departure voice recording; and
   authenticate the arrival voice recording by applying a cosine similarity function to the discriminative embedding vector of the arrival voice recordings and the departure voice recordings.

7. The method of claim 1, further comprising:
   encrypting, by the arrival kiosk at the departure location, the departure information including the departure passport, the departure boarding pass, the departure photo of the passenger's face, and the departure voice recording to generate encrypted departure information.

8. The method of claim 7, further comprising decrypting, by the arrival kiosk at the arrival location, the departure voice recording and the departure photo.

9. The method of claim 8, wherein the departure kiosk at the departure location is configured to encrypt the departure information by an Advanced Encryption Standard (AES).

* * * * *